United States Patent
Hamer (10) Patent No.: US 10,572,657 B2
(45) Date of Patent: Feb. 25, 2020

(54) DETECTION OF OBJECT CREATION

(71) Applicant: HEWLETT PACKARD ENTERPRISE DEVELOPMENT LP, Houston, TX (US)

(72) Inventor: Philip Edward Hamer, Palo Alto, GA (US)

(73) Assignee: Micro Focus LLC, Santa Clara, CA (US)

(*) Notice: Subject to any disclaimer, the term of this patent is extended or adjusted under 35 U.S.C. 154(b) by 299 days.

(21) Appl. No.: 15/335,953

(22) Filed: Oct. 27, 2016

(65) Prior Publication Data

US 2018/0121648 A1 May 3, 2018

(51) Int. Cl.
*G06F 11/36* (2006.01)
*G06F 21/55* (2013.01)
*G06F 9/448* (2018.01)
*G06F 8/20* (2018.01)
*G06F 21/54* (2013.01)

(52) U.S. Cl.
CPC .......... *G06F 21/54* (2013.01); *G06F 11/3644* (2013.01); *G06F 21/554* (2013.01); *G06F 8/24* (2013.01); *G06F 9/4488* (2018.02); *G06F 2221/031* (2013.01)

(58) Field of Classification Search
CPC .. G06F 21/54; G06F 21/554; G06F 2221/031; G06F 11/3644; G06F 8/24; G06F 9/4488
See application file for complete search history.

(56) References Cited

U.S. PATENT DOCUMENTS

| | | | |
|---|---|---|---|
| 6,093,216 A | 7/2000 | Adl-Tabatabai et al. | |
| 6,795,964 B2 | 9/2004 | Ramasamy | |
| 7,624,381 B1 | 11/2009 | Czajkowski | |
| 8,473,922 B2 | 6/2013 | Li | |
| 8,726,225 B2 | 5/2014 | Shu | |
| 9,372,688 B1* | 6/2016 | Ben-Yair | G06F 9/449 |

(Continued)

OTHER PUBLICATIONS

European Patent Office, Extended European Search Report for 17197410.8-1870, dated Jan. 2, 2018 (9 pages).

(Continued)

*Primary Examiner* — Alexander Lagor
*Assistant Examiner* — Vu V Tran (57) ABSTRACT

Examples disclosed herein relate to detecting object creation when instrumenting an application for security purposes. The examples enable determining, by an instrumenter implemented by a physical processor that implements machine readable instructions, whether to instrument a function; responsive to determining that the function should be instrumented, determining, by the instrumenter, that a base class constructor is to be called by the function; before the base class constructor is called, pushing, by the instrumenter, object related information onto a local storage registry; analyzing, by the instrumenter, the local storage registry to determine whether an object associated with the function was created based on information in the local storage registry; and responsive to determining that the object was created, applying, by the instrumenter, a security rule to the function.

20 Claims, 4 Drawing Sheets

(56) References Cited

U.S. PATENT DOCUMENTS

| | | | | |
|---|---|---|---|---|
| 2012/0297371 A1* | 11/2012 | Greifeneder | ........ | G06F 11/3495 |
| | | | | 717/128 |
| 2013/0086625 A1* | 4/2013 | Driscoll | ................. | G06F 21/52 |
| | | | | 726/1 |
| 2014/0165204 A1* | 6/2014 | Williams | .............. | G06F 21/577 |
| | | | | 726/25 |
| 2014/0237453 A1* | 8/2014 | Hulick, Jr. | ................ | G06F 8/70 |
| | | | | 717/127 |
| 2015/0169388 A1* | 6/2015 | Hildebrandt | ............ | G06F 9/542 |
| | | | | 719/318 |
| 2015/0186114 A1* | 7/2015 | Chirhart | ................... | G06F 8/30 |
| | | | | 717/110 |
| 2015/0294113 A1* | 10/2015 | Troeger | ................ | G06F 21/577 |
| | | | | 726/25 |
| 2018/0107821 A1* | 4/2018 | Eshkenazi | ............... | G06F 21/51 |

OTHER PUBLICATIONS

Gschwind et al., "Using run-time data for program comprehension," IEEE International Workshop on Program Comprehension 2003 (6 pages).

\* cited by examiner

DETECTION OF OBJECT CREATION

BACKGROUND

Application security tools may facilitate modification of runtime code to detect and modify code that might present security issues. In particular, as an application runs, an instrumenter sits inside the application process and is notified of code that is about to be executed. The instrumenter looks at the code, applies a ruleset to the code, and determines whether the code should be modified. Responsive to determining that the code should be modified, the instrumenter modifies the code to determine whether a security issue exists.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for detection of object creation. The disclosed examples may include systems, devices, computer-readable storage media, and methods for detection of object creation. For purposes of explanation, certain examples are described with reference to the components illustrated in FIGS. 1-5B. The functionality of the illustrated components may overlap, however, and may be present in a fewer or greater number of elements and components.

Figure 5:
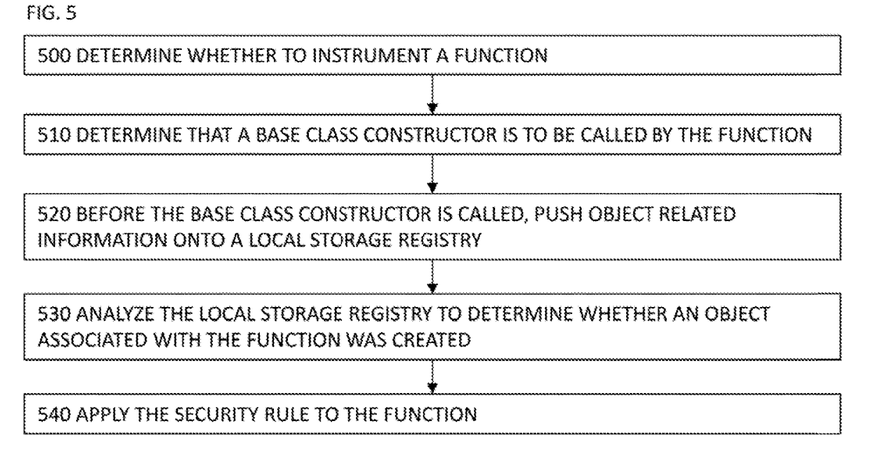
FIG. 5 is a flow diagram depicting an example method for detection of object creation.
Figure 5A:
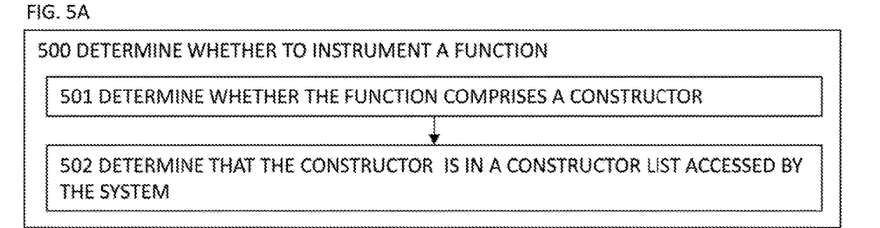
FIG. 5A is a flow diagram depicting an example method for detection of object creation.
Figure 5B:
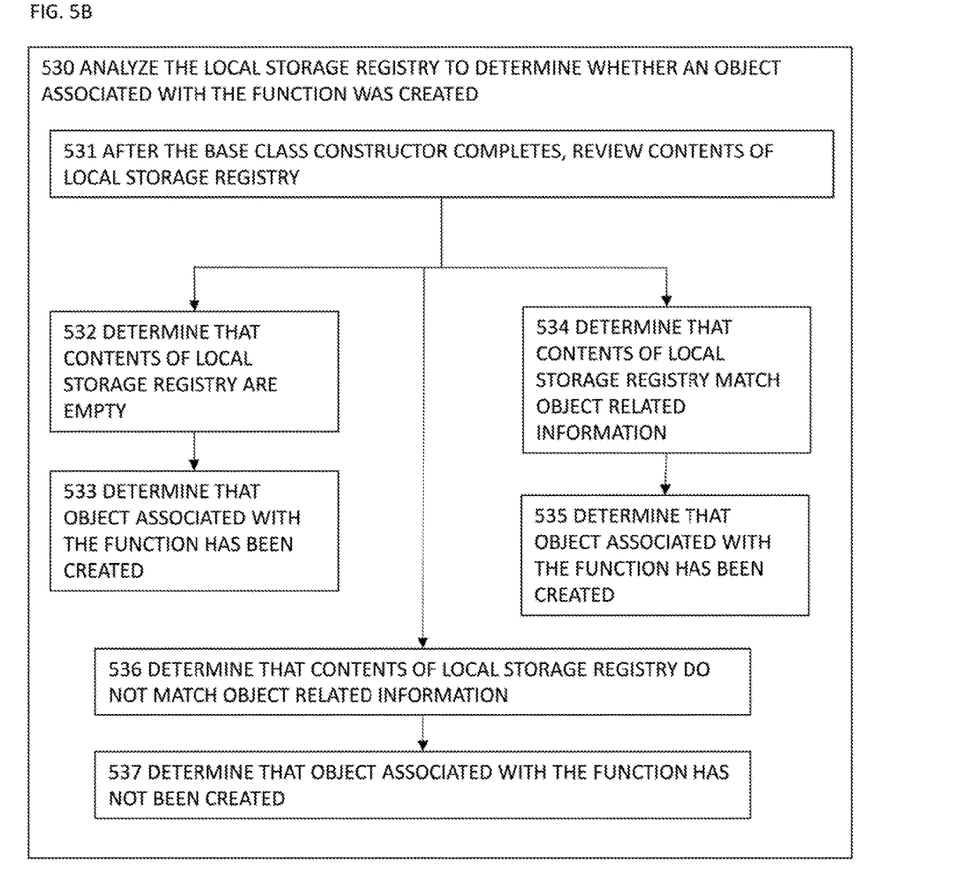
FIG. 5B is a flow diagram depicting an example method for detection of object creation.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5, 5A, and 5B are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

Application security tools may facilitate modification of runtime code to detect and modify code that might present security issues. In particular, as an application runs, an instrumenter sits inside the application process and is notified of code that is about to be executed. The instrumenter looks at the code, applies a ruleset to the code, and determines whether the code should be modified. Responsive to determining that the code should be modified, the instrumenter modifies the code to determine whether a security issue exists.

Examples discussed herein address these technical issues by providing an application security system that enables an instrumenter to determine when an object is being constructed based on a constructor appearing in the code and when the constructor is being used to derive a different object. The instrumenter is implemented by a physical processor that executes machine readable instructions.

For example, a technical solution may facilitate detection of object creation by determining, by an instrumenter implemented by a physical processor that implements machine readable instructions, whether to instrument a function. Responsive to determining that the function should be instrumented, the instrumenter may determine that a base class constructor is to be called by the function. Before the base class constructor is called, the instrumenter may push object related information onto a local storage registry. The instrumenter may then analyze the local storage registry to determine whether an object associated with the function was created based on information in the local storage registry. This analysis occurs after the call to the base constructor returns. Responsive to determining that the object was created, the instrumenter may apply a security rule to the function.

In some examples, the instrumenter instruments objects from a user-specified list of classes (e.g., a list of objects that appear in rules) and does not instrument objects not included in the user-specified list. Responsive to an instrumenter being given a function to examine and possibly modify, the instrumenter first checks whether the function comprises a constructor. Responsive to determining that the function comprises a constructor, the instrumenter then checks whether the function comprises a constructor in the user-specified list. If both are not true, the instrumenter ignores the function. If the function comprises a constructor in the user-specified list, the instrumenter begins examining the constructor.

As a guiding principle of object oriented systems and a central tenet of this technical solution, every constructor must call a base class constructor (or another constructor in the same class, which eventually calls a base class constructor). Until the constructor calls a base class, the constructor may be considered to be in an 'uninitialized state' and accordingly a bytecode verifier allows a limited set of operations.

The instrumenter examines the constructor in the user-specified list in the following manner. First, the instrumenter scans for the call to the base class constructor. Before the base class constructor is called, the instrumenter outputs code that pushes object related information onto a local storage registry. The local storage registry may comprise, for example, a thread-local stack. By using a thread-local stack, the application security system facilitates analysis and security for multi-thread applications. The object related information that is pushed onto the thread-local stack may comprise, for example, a signature of the constructor that the instrumenter is in, or a signature of the base class constructor that is about to be called.

Immediately after the call to the base class constructor, as data is being used by the function, the instrumenter outputs code that pushes items onto the stack. By pushing the items onto the thread-local stack, the system may determine whether issues occurred during construction of the function (e.g., responsive to items still remaining on the stack after the call to the function has completed).

Once the function has finished running and being instrumented, responsive to determining that the stack is empty or that the stack matches the object related information, the instrumenter knows that the object has been constructed. Responsive to the stack having an invoking signature that is not equal to the signature of the constructor we are in, the instrumenter may determine that an exception has been thrown.

In some examples, the instrumenter may review the thread-local stack responsive to determining that another function is to be called. As such, the instrumenter recognizes that the called function has completed because a new function is called and analyzed by the instrumenter.

This technical solution allows for recognition of object creation of arbitrary types during runtime code instrumentation. In particular, this technical solution allows a runtime code instrumentation system to analyze completely constructed objects in an object oriented system immediately (or shortly) after they are initialized. This facilitates reliable detection of object creation for a user-specified list of class types. The user-specified list of class types comes from a list of security rules that are applied to the code that is being instrumented. Because not all functions are instrumented, the technical solution may be a more efficient way to inspect and modify code during runtime to alleviate security concerns and may have improved performance.

This technical solution also facilitates use of a modern bytecode verifier that has stricter rules for how to handle constructors. For example, this technical solution maintains context in the constructor chain regardless of whether an exception is thrown in the function. Further, because the technical solution works with a local storage, the technical solution may be applied in a multi-threaded environment.

Figure 1:
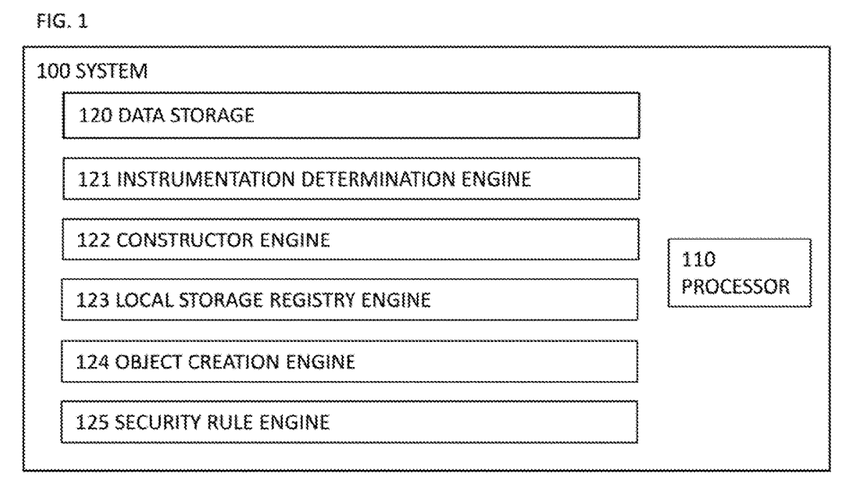
FIG. 1 is a block diagram depicting an example system for detection of object creation.

FIG. 1 is an example system 100 in which various examples may be implemented as an object creation detection system 100. In some examples, object creation detection system 100 may include a computing device. In some examples, each computing device may perform the functionality described herein without any communication to other devices. For example, the computing devices may include a laptop computing device, a desktop computing device, an all-in-one computing device, a tablet computing device, a mobile phone, an electronic book reader, and/or other electronic device suitable for providing application security.

According to various implementations, object creation detection system 100 and the various components described herein may be implemented in hardware and/or a combination of hardware and programming that configures hardware. Furthermore, in FIG. 1 and other Figures described herein, different numbers of components or entities than depicted may be used. In some examples, object creation detection system 100 may comprise a single computing device that facilitates detection of object creation while providing application security. In particular, object creation detection system 100 may facilitate instrumentation of code for execution. To that end, system 100 may perform run-time analysis of an application. System 100 may be notified of a function (e.g., a set of code) that is to be executed and may analyze and modify the function to prevent security issues. For example, system 100 may analyze the function to be called, analyze the data used by the function, and determine if any security issues exist. The system 100 may determine whether security issues exist by applying security rules to the function. A security rule may be associated with a particular function and/or with a particular object that may be part of a function. Responsive to the system 100 recognizing that the particular function or the particular object is involved, the system 100 may apply the associated security rule to determine whether the function needs to be modified to alleviate a security issue. As such, system 100 overcomes an existing technical challenge and is able to differentiate between a first object associated with a security rule being fully constructed during a function and an object that is derived from the first object being constructed, where the derived object is not associated with a security rule.

As such, object creation detection system 100 may comprise a processor 110, an instrumentation determination engine 121, a constructor engine 122, a local storage registry engine 123, an object creation engine 124, a security rule engine 125, and/or other engines. The term "engine", as used herein, refers to a combination of hardware and programming that performs a designated function. As is illustrated with respect to FIGS. 3-4, the hardware of each engine, for example, may include one or both of a physical processor and a machine-readable storage medium, while the programming is instructions or code stored on the machine-readable storage medium and executable by the processor to perform the designated function.

In performing their respective functions, engines 121-125 may access data storage 120 and/or other suitable database(s). Data storage 120 may represent any memory accessible to object creation detection system 100 that can be used to store and retrieve data. Data storage 120 and/or other databases communicably coupled to object creation detection system 100 may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Object creation detection system 100 may access data storage 120 locally or remotely via a network.

Data storage 120 may include a database to organize and store data. The database may reside in a single or multiple physical device(s) and in a single or multiple physical location(s). The database may store a plurality of types of data and/or files and associated data or file description, administrative information, or any other data.

Instrumentation determination engine 121 may determine whether to instrument a function. Responsive to the system 100 being given a function to instrument, instrumentation determination engine 121 may determine whether the function is a constructor. Responsive to the function not being a constructor, the instrumentation determination engine 121 may ignore the function and look to the next potential function to instrument. Responsive to the function comprising a constructor, the instrumentation determination engine 121 may then determine whether the function comprises a constructor in a constructor list.

The instrumentation determination engine 121 may determine whether the function comprises a constructor in a constructor list by comparing information about the constructor (e.g., a signature of the constructor) with corresponding information for each construction in a set of constructors of the constructor list. The instrumentation determination engine 121 may determine that the function should be instrumented responsive to determining that the function comprises a constructor in the constructor list.

The constructor list may comprise, for example, a set of constructors that are associated with a set of security rules to be applied to the functions. Each constructor in the set of constructors may comprise at least one object that is associated with a security rule.

Each security rule in the set of security rules may comprise, for example, an identifier of the security rule, information regarding application of the security rule, information regarding remediation responsive to determining that an issue exists, information about an object or set of objects to which the rule applies, and/or other information related to the security rule.

In some examples, the constructor list and/or the list of security rules may be stored in the data storage 120, may be stored in another storage communicably coupled to system 100, may be obtained by the system via a network connected to system 100, may be received from an administrator of system 100, may be machine learned from an initial set of security rules, and/or may be otherwise accessed.

Responsive to the instrumentation determination engine 121 determining that the function should be instrumented, the constructor engine 122 may determine that a base class constructor is to be called by the function. The constructor engine 122 may scan the function for a call to a base class constructor or to a call to a constructor in the same class (which will eventually lead to a call to a base class constructor).

Responsive to the constructor engine 122 determining that a base class constructor (or a constructor in the same class) is to be called, local storage registry engine 123 may push object related information onto a local storage registry before the base class (or same class) constructor is called. In some examples, the local storage registry comprises a thread-local stack. In some examples, the object related information that the local storage registry engine 123 pushes onto the local storage registry may comprise an invoking signature of the base class (or same class) constructor. In some examples, the object related information comprises a signature of the constructor that the system is examining.

In some examples, as execution of the constructor is performed, the local storage registry engine 123 may output code that pushes items onto the local storage registry. By pushing the items onto the thread-local stack, the local storage registry engine 123 may determine whether issues occurred during construction of the function (e.g., responsive to items still remaining on the stack after the call to the function has completed. For example, after the call to the base class constructor has completed, the local storage registry engine 123 may output code that pops an item from the local storage registry responsive to an exception being thrown. By determining that an item exists on the local storage registry and popping that item from the local storage registry, the local storage registry engine 123 may allow the system 100 and/or a security analyst to review the local storage registry at a later time to access information that may still remain in the local storage registry and determine what issue caused the information to be popped from the local storage registry.

Immediately after the call to the base class constructor, as data is being used by the function, the instrumenter outputs code that pushes items onto the stack. By pushing the items onto the thread-local stack, the local storage registry engine 123 may determine whether issues occurred during construction of the function (e.g., responsive to items still remaining on the stack after the call to the function has completed.

Object creation engine 124 may analyze the local storage registry to determine whether an object associated with the function was created. The object creation engine 124 may review the information in the local storage registry. Responsive to determining that the local storage registry is empty, the object creation engine 124 may determine that the object associated with the constructor in the function was created. In another example, responsive to determining that the information in the local storage registry does match the object related information pushed onto the local storage registry by the local storage registry engine 123, object creation engine 124 may determine that the object associated with the function was created.

Responsive to determining that information in the local storage registry does not match the object related information pushed onto the local storage registry by the local storage registry engine 123, object creation engine 124 may determine that an exception was thrown during construction and that the object associated with the constructor was not created. In another example, responsive to a top item of the local storage registry not matching an invoking signature of the base class constructor of the function, the object creation engine 124 may similarly determine that an exception was thrown during construction and the object was not created.

In some examples, the object creation engine 124 may analyze the local storage registry responsive to determining that a new function is to be called. By determining that a new function is to be called, the object creation engine 124 may know that the call to the base class constructor of the previous function, and in general, processing for the entire function, has completed. For example, the object creation engine 124 may determine that processing associated with the function has completed and may determine whether an object was created based on information in the local storage registry responsive to determining that the new function is to be called.

Security rule engine 125 may apply a security rule to the function, responsive to the object creation engine 124 determining that the object was created. For example, security rule engine 125 may apply the security rule that was associated with the object created by the function. In some examples, the security rule engine 125 may, in conjunction with the instrumentation determination engine 121, determine that a function is about to be called and may determine, from a list of security rules, whether a security rule applies to the function. The security rule engine 125 may determine whether a security rule applies by determining a set of objects created and/or used by the function and may determine whether any security rule in the list of security rules is associated with any of the set of objects associated with the function. Responsive to a security rule being associated with an object associated with the function, the security rule engine 125 may determine that the security rule should be applied to the function.

In some examples, the list of security rules may be stored in the data storage 120, may be stored in another storage communicably coupled to system 100, may be obtained by the system via a network connected to system 100, may be received from an administrator of system 100, may be machine learned from an initial set of security rules, and/or may be otherwise accessed.

An example of how system 100 handles instrumentation of three classes A, B, and C may be helpful in understanding the technical solution described herein. Class C may derive from class B, which may derive from class A. Based on the list of security rules, system 100 may be interested in objects created by constructing class B and objects created by constructing class C but not objects created by constructing class A. In this example, because class C is derived from class B, class B may be called and a constructor for class B may be executed but an object of type B will not be created.

In an example in which a function comprising a constructor to class C is to be called, system 100 will, per the description above, instrument calls to the base class constructors within a constructor body. In the function being instrumented by system 100, class C's constructor will call class B's constructor, but B is not the outermost constructor. Because class C is derived from class B, class C is the outermost constructor. Responsive to the class C constructor calling its base class constructor (or a constructor of the same class), system 100 may have pushed an invoking signature for the base class (or same class) constructor onto a thread-local stack.

While B's constructor is executing, the top of the stack thus has an item whose invoking signature is not equal to the invoking signature of B's constructor. Given that, system 100 may determine that execution is not in an outermost constructor and that an object for class B has not been created. If the system 100 reviews the stack and the stack is empty, system 100 may determine that an object for class C has been constructed.

If the system 100 reviews the stack in an outermost constructor (e.g., where the invoking signature matches the signature of the constructor being constructed) and sees that the stack is not empty, the system 100 may determine that an exception occurred. For example, system 100 may determine that an exception occurred previously during object construction (for example, in a base class constructor that is not being constructed like class A's constructor).

Responsive to the system 100 determining that an object for class C has been created and the function has completed, the system 100 may apply a corresponding security rule to the function.

Figure 2:
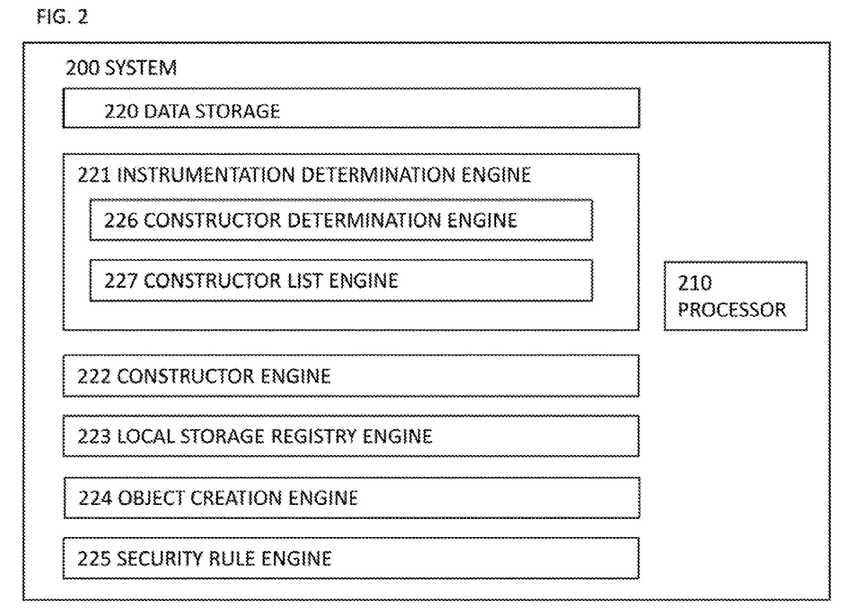
FIG. 2 is a block diagram depicting an example machine-readable storage medium comprising instructions executable by a processor for detection of object creation.

FIG. 2 is a block diagram depicting an example object creation detection system 200. Object creation detection system 200 may comprise a processor 210, instrumentation determination engine 221, a constructor engine 222, and a local storage registry engine 223. Instrumentation determination engine 221 may comprise, for example, a constructor determination engine 226, a constructor list engine 227, and/or other engines. The functionality performed by engines 226-227 of instrumentation engine 221 are described above. Engines 221-227 represent and perform the functionality described above with respect to engines 121-125.

Figure 3:
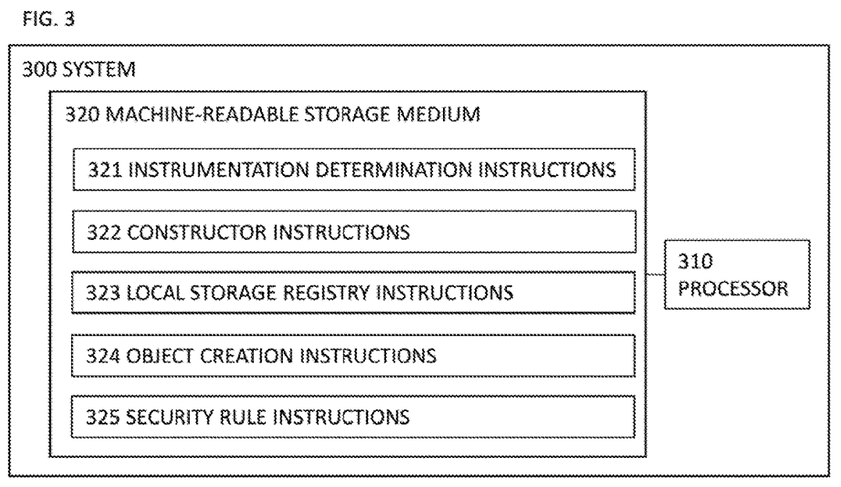
FIG. 3 is a block diagram depicting an example machine-readable storage medium comprising instructions executable by a processor for detection of object creation.

FIG. 3 is a block diagram depicting an example machine-readable storage medium 320 comprising instructions executable by a processor 310 for determining object creation detection.

In the foregoing discussion, engines 121-125 were described as combinations of hardware and programming. Engines 121-125 may be implemented in a number of fashions. Referring to FIG. 3, the programming may include processor executable instructions 321-325 stored on a machine-readable storage medium 320 and the hardware may include a processor 310 for executing those instructions. Thus, machine-readable storage medium 320 can be said to store program instructions or code that when executed by processor 310 implements object creation detection system 100 of FIG. 1.

In FIG. 3, the executable program instructions in machine-readable storage medium 320 are depicted as instrumentation determination instructions 321, constructor instructions 322, local storage registry instructions 323, object creation instructions 324, and security rule instructions 325. Instructions 321-325 represent program instructions that, when executed, cause processor 310 to implement engines 121-125, respectively.

Figure 4:
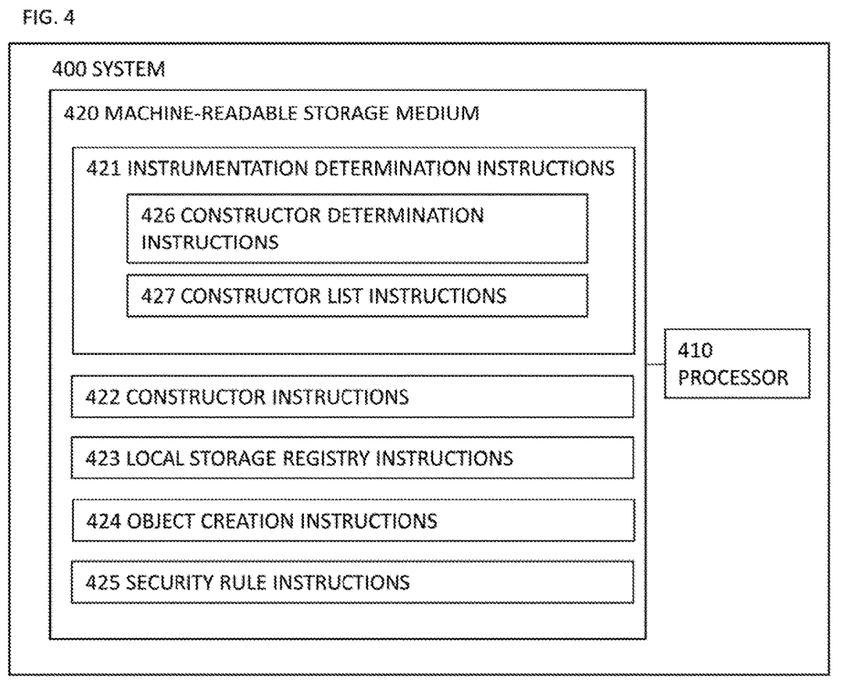
FIG. 4 is a block diagram depicting an example machine-readable storage medium comprising instructions executable by a processor for detection of object creation.

FIG. 4 is a block diagram depicting an example machine-readable storage medium 420 comprising instructions executable by a processor 410 for determining object creation detection.

In the foregoing discussion, engines 221-227 were described as combinations of hardware and programming. Engines 221-227 may be implemented in a number of fashions. Referring to FIG. 4, the programming may be processor executable instructions 421-427 stored on a machine-readable storage medium 420 and the hardware may include a processor 410 for executing those instructions. Thus, machine-readable storage medium 420 can be said to store program instructions or code that when executed by processor 410 implements object creation detection system 200 of FIG. 2.

In FIG. 4, the executable program instructions in machine-readable storage medium 420 are depicted as instrumentation determination instructions 421, constructor instructions 422, local storage registry instructions 423, object creation instructions 424, and security rule instructions 425. Instrumentation determination instructions 421 may comprise, for example, constructor determination instructions 426, constructor list instructions 427, and/or other instructions. Instructions 421-427 represent program instructions that, when executed, cause processor 410 to implement engines 221-227, respectively.

Machine-readable storage medium 320 (or machine-readable storage medium 420) may be any electronic, magnetic, optical, or other physical storage device that contains or stores executable instructions. In some implementations, machine-readable storage medium 320 (or machine-readable storage medium 420) may be a non-transitory storage medium, where the term "non-transitory" does not encompass transitory propagating signals. Machine-readable storage medium 320 (or machine-readable storage medium 420) may be implemented in a single device or distributed across devices. Likewise, processor 310 (or processor 410) may represent any number of processors capable of executing instructions stored by machine-readable storage medium 320 (or machine-readable storage medium 420). Processor 310 (or processor 410) may be integrated in a single device or distributed across devices. Further, machine-readable storage medium 320 (or machine-readable storage medium 420) may be fully or partially integrated in the same device as processor 310 (or processor 410), or it may be separate but accessible to that device and processor 310 (or processor 410).

In one example, the program instructions may be part of an installation package that when installed can be executed by processor 310 (or processor 410) to implement object creation detection system 100. In this case, machine-readable storage medium 320 (or machine-readable storage medium 420) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 320 (or machine-readable storage medium 420) may include a hard disk, optical disk, tapes, solid state drives, RAM, ROM, EEPROM, or the like.

Processor 310 may be at least one central processing unit (CPU), microprocessor, and/or other hardware device suitable for retrieval and execution of instructions stored in machine-readable storage medium 320. Processor 310 may fetch, decode, and execute program instructions 321-325, and/or other instructions. As an alternative or in addition to retrieving and executing instructions, processor 310 may include at least one electronic circuit comprising a number of electronic components for performing the functionality of at least one of instructions 321-325, and/or other instructions.

Processor 410 may be at least one central processing unit (CPU), microprocessor, and/or other hardware device suitable for retrieval and execution of instructions stored in machine-readable storage medium 420. Processor 410 may fetch, decode, and execute program instructions 421-427, and/or other instructions. As an alternative or in addition to retrieving and executing instructions, processor 410 may include at least one electronic circuit comprising a number of electronic components for performing the functionality of at least one of instructions 421-427, and/or other instructions.

FIG. 5 is a flow diagram depicting an example method 500 for determining object creation detection. The various processing blocks and/or data flows depicted in FIG. 5 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the method of FIG. 5 as illustrated (and described in greater detail below) is meant be an example and, as such, should not be viewed as limiting. The method of FIG. 5 may be implemented in the form of executable instructions stored on a machine-readable storage medium, such as storage medium 420, and/or in the form of electronic circuitry.

In an operation 500, a determination may be made as to whether to instrument a function. For example, the system 100 (and/or the instrumentation determination engine 121, the instrumentation determination instructions 321, or other resource of the system 100) may determine whether to instrument the function. The system 100 may determine whether to instrument the function in a manner similar or the same as that described above in relation to the execution of the instrumentation determination engine 121, the instrumentation determination instructions 321, and/or other resource of the system 100.

In some examples, determining whether to instrument a function may be done in several manners. FIG. 5A is a flow diagram depicting an example method for determining change detection. In particular, FIG. 5A shows an example of how to determine whether to instrument a function (as discussed above with respect to operation 500). The method of FIG. 5A as illustrated (and described in greater detail below) is meant to be an example and, as such, should not be viewed as limiting. The method of FIG. 5A may be implemented in the form of executable instructions stored on a machine-readable storage medium, such as storage medium 420, and/or in the form of electronic circuitry.

In an operation 501, a determination may be made as to whether the function comprises a constructor. For example, the system 100 (and/or the constructor determination engine 226, the constructor determination instructions 426, or other resource of the system 200) may determine whether the function comprises a constructor. The system 100 may determine whether the function comprises a constructor in a manner similar or the same as that described above in relation to the execution of the constructor determination engine 226, the constructor determination instructions 426, or other resource of the system 200.

In an operation 501, a determination may be made as to whether the construction is included in a constructor list. For example, the system 100 (and/or the constructor list engine 227, the constructor list instructions 427, or other resource of the system 200) may determine whether the construction is included in the constructor list. The system 100 may determine whether the construction is included in the constructor list in a manner similar or the same as that described above in relation to the execution of the constructor list engine 227, the constructor list instructions 427, or other resource of the system 200.

Returning to FIG. 5, in an operation 510, responsive to determining that the function should be instrumented, a determination may be made as to whether a base class constructor is to be called by the function. For example, the system 100 (and/or the constructor engine 122, the constructor instructions 322, or other resource of the system 100) may determine whether a base class constructor is to be called by the function. The system 100 may determine whether a base class constructor is to be called by the function in a manner similar or the same as that described above in relation to the execution of the constructor engine 122, the constructor instructions 322, and/or other resource of the system 100.

In an operation 520, before the base class constructor is called, object related information may be pushed onto a local storage registry. For example, the system 100 (and/or the local storage registry engine 123, the local storage registry instructions 32, or other resource of the system 100) may push object related information onto the local storage registry. The system 100 may push object related information onto the local storage registry in a manner similar or the same as that described above in relation to the execution of the local storage registry engine 123, the local storage registry instructions 323, and/or other resource of the system 100.

In an operation 530, the local storage registry may be analyzed to determine whether an object associated with the function was created based on information in the local storage registry. For example, the system 100 (and/or the object creation engine 124, the object creation instructions 324, or other resource of the system 100) may analyze the local storage registry. The system 100 may analyze the local storage registry in a manner similar or the same as that described above in relation to the execution of the object creation engine 124, the object creation instructions 324, and/or other resource of the system 100.

In some examples, analyzing the local storage registry may be done in several manners. FIG. 5B is a flow diagram depicting an example method for determining change detection. In particular, FIG. 5B shows an example of how to determine whether to instrument a function (as discussed above with respect to operation 500). The method of FIG. 5B as illustrated (and described in greater detail below) is meant to be an example and, as such, should not be viewed as limiting. The method of FIG. 5B may be implemented in the form of executable instructions stored on a machine-readable storage medium, such as storage medium 320, and/or in the form of electronic circuitry.

In an operation 531, after the base class constructor completes (and/or after the entire function has completed processing), the contents of the local storage registry may be reviewed. For example, the system 100 (and/or the object creation engine 224, the object creation instructions 324, or other resource of the system 100) may review the contents of the local storage registry. The system 100 may review the contents of the local storage registry in a manner similar or the same as that described above in relation to the execution of the object creation engine 224, the object creation instructions 324, or other resource of the system 100.

In an operation 532, a determination may be made that the contents of the local storage registry are empty. For example, the system 100 (and/or the object creation engine 224, the object creation instructions 324, or other resource of the system 100) may determine that the contents of the local storage registry are empty. The system 100 may determine that the contents of the local storage registry are empty in a manner similar or the same as that described above in relation to the execution of the object creation engine 224, the object creation instructions 324, or other resource of the system 100.

In an operation 533, responsive to determining that the contents of the local storage registry are empty, a determination may be made that an object associated with the function has been created. For example, the system 100 (and/or the object creation engine 224, the object creation instructions 324, or other resource of the system 100) may determine that an object associated with the function has been created. The system 100 may determine that an object associated with the function has been created in a manner similar or the same as that described above in relation to the execution of the object creation engine 224, the object creation instructions 324, or other resource of the system 100.

In an operation 534, a determination may be made that the contents of the local storage registry match the object related information. For example, the system 100 (and/or the object creation engine 224, the object creation instructions 324, or other resource of the system 100) may determine that the contents of the local storage registry match the object related information. The system 100 may determine that the contents of the local storage registry match the object related information in a manner similar or the same as that described above in relation to the execution of the object creation engine 224, the object creation instructions 324, or other resource of the system 100.

In an operation 535, responsive to determining that the contents of the local storage registry match the object related information, a determination may be made that an object associated with the function has been created. For example, the system 100 (and/or the object creation engine 224, the object creation instructions 324, or other resource of the system 100) may determine that an object associated with the function has been created. The system 100 may determine that an object associated with the function has been created in a manner similar or the same as that described above in relation to the execution of the object creation engine 224, the object creation instructions 324, or other resource of the system 100.

In an operation 536, a determination may be made that the contents of the local storage registry do not match the object related information. For example, the system 100 (and/or the object creation engine 224, the object creation instructions 324, or other resource of the system 100) may determine that the contents of the local storage registry do not match the object related information. The system 100 may determine that the contents of the local storage registry do not match the object related information in a manner similar or the same as that described above in relation to the execution of the object creation engine 224, the object creation instructions 324, or other resource of the system 100.

In an operation 537, responsive to determining that the contents of the local storage registry do not match the object related information, a determination may be made that an object associated with the function has not been created. For example, the system 100 (and/or the object creation engine 224, the object creation instructions 324, or other resource of the system 100) may determine that an object associated with the function has not been created. The system 100 may determine that an object associated with the function has not been created in a manner similar or the same as that described above in relation to the execution of the object creation engine 224, the object creation instructions 324, or other resource of the system 100.

Returning to FIG. 5, in an operation 540, responsive to determining that the object was created, a security rule may be applied to the function. For example, the system 100 (and/or the security rule engine 125, the security rule instructions 325, or other resource of the system 100) may apply the security rule. The system 100 may apply the security rule in a manner similar or the same as that described above in relation to the execution of the security rule engine 125, the security rule instructions 325, and/or other resource of the system 100.

The foregoing disclosure describes a number of example implementations for detection of object creation. The disclosed examples may include systems, devices, computer-readable storage media, and methods for detection of object creation. For purposes of explanation, certain examples are described with reference to the components illustrated in FIGS. 1-5B. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the operations described in connection with FIGS. 5, 5A, and 5B are examples and are not intended to be limiting. Additional or fewer operations or combinations of operations may be used or may vary without departing from the scope of the disclosed examples. Furthermore, implementations consistent with the disclosed examples need not perform the sequence of operations in any particular order.

Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for detection of object creation, the method comprising:
   determining, by an instrumenter implemented by a physical processor that implements machine readable instructions, whether to instrument a function, wherein determining whether to instrument the function comprises:
      determining, by the instrumenter, whether the function includes a first constructor,
      responsive to determining that the function includes the first constructor, determining, by the instrumenter, that a list of constructors includes the first constructor, and
      determining that the function should be instrumented responsive to the list of constructors including the first constructor;
   responsive to determining that the function should be instrumented, determining, by the instrumenter, that a base class constructor is to be called by the function;
   before the base class constructor is called, pushing, by the instrumenter, object related information onto a local storage registry;
   analyzing, by the instrumenter, the local storage registry, wherein the analyzing comprises reviewing information in the local storage registry to determine whether an object associated with the function was created; and
   responsive to determining that the object was created, applying, by the instrumenter, a security rule to the function.

2. The method of claim 1,
   wherein the list of constructors is associated with a set of security rules, and wherein the set of security rules includes the applied security rule.

3. The method of claim 2, wherein determining whether to instrument the function further comprises:
   ignoring the function responsive to determining that the list of constructors does not include the first constructor.

4. The method of claim 1, wherein analyzing the local storage registry further comprises:
   determining, by the instrumenter, that the local storage registry is empty; and
   responsive to determining that the local storage registry is empty, determining, by the instrumenter, that the object was created based on the local storage registry being empty.

5. The method of claim 1, wherein analyzing the local storage registry comprises:
   determining, by the instrumenter, that an exception was thrown during construction of the object based on the object related information not matching the reviewed information in the local storage registry.

6. The method of claim 5, wherein the object related information includes an invoking signature of the base class constructor, and wherein the method further comprises:
   determining, by the instrumenter, that the exception was thrown responsive to a top item of the local storage registry not matching the invoking signature of the base class constructor.

7. The method of claim 1, wherein analyzing the local storage registry further comprises:
   determining that a new function is to be called; and
   reviewing the information in the local storage registry before the new function is called.

8. The method of claim 1, wherein the local storage registry comprises a thread-local stack.

9. A non-transitory machine-readable storage medium comprising instructions executable by a processor of a computing device for detection of object creation, the machine-readable storage medium comprising:
   instructions to determine whether to instrument a function, wherein the instructions to determine whether to instrument the function comprise:
      instructions to determine whether the function includes a first constructor,
      instructions to, responsive to a determination that the function includes the first constructor, determine that a list of constructors includes the first constructor, and
      instructions to determine that the function should be instrumented responsive to the list of constructors comprising the first constructor;
   instructions to, responsive to a determination that the function should be instrumented, determine that a base class constructor is to be called;
   instructions to, before the base class constructor is called, push object related information onto a local storage registry;
   instructions to analyze the local storage registry, wherein the instructions to analyze the local storage registry comprise instructions to review information in the local storage registry to determine whether an object associated with the function was created; and
   instructions to, responsive to a determination that the object was created, apply a security rule to the function, wherein the security rule is associated with the object associated with the function.

10. The non-transitory machine-readable storage medium of claim 9,
   wherein the list of constructors is associated with a set of security rules, and wherein the set of security rules includes the applied security rule.

11. The non-transitory machine-readable storage medium of claim 9,
   wherein the instructions to analyze the local storage registry comprise:
   instructions to determine that the local storage registry is empty;
   instructions to, responsive to a determination that the local storage registry is empty, determine that the object was created based on the local storage registry being empty, wherein the local storage registry comprises a thread-local stack.

12. The non-transitory machine-readable storage medium of claim 9, wherein the instructions to analyze the local storage registry comprise:
   instructions to determine that an exception was thrown during construction of the object based on the object related information not matching the reviewed information in the local storage registry.

13. The non-transitory machine-readable storage medium of claim 12, wherein the object related information includes an invoking signature of the base class constructor, and wherein the instructions further comprise:
   instructions to determine that the exception was thrown responsive to a top item of the local storage registry not matching the invoking signature of the base class constructor.

14. The non-transitory machine-readable storage medium of claim 9, wherein the instructions to analyze the local storage registry comprise:
   instructions to determine a new function is to be called; and
   instructions to review the information in the local storage registry before the new function is called.

15. A system for detection of object creation comprising:
   a hardware processor that implements machine readable instructions to cause the system to:
   determine whether to instrument a function based on a security rule, wherein the instructions to determine whether to instrument the function comprise:
      instructions to determine whether the function includes a first constructor,
      instructions to, responsive to a determination that the function includes the first constructor, determine that a list of constructors includes the first constructor, and
      instructions to determine that the function should be instrumented responsive to the list of constructors comprising the first constructor;
   responsive to a determination that the function should be instrumented, determine that a base class constructor is to be called;
   before the base class constructor is called, push object related information onto a thread-local stack;
   analyze the thread-local stack, wherein the instructions to analyze the thread-local stack comprise instructions to review information in the thread-local stack to determine whether an object associated with the function was created; and
   responsive to a determination that the object was created, apply the security rule to the function, wherein the security rule is associated with the object associated with the function.

16. The system of claim 15,
   wherein the list of constructors is associated with a set of security rules, and wherein the set of security rules includes the applied security rule.

17. The system of claim 15, wherein the instructions to analyze the thread-local stack comprise instructions to:
   determine that the thread-local stack is empty;
   responsive to determining that the thread-local stack is empty, determine that the object was created based on the thread-local stack being empty.

18. The system of claim 15, wherein the instructions to analyze the thread-local stack comprise instructions to:
   determine that an exception was thrown during construction of the object based on the object related information not matching the reviewed information in the thread-local stack.

19. The system of claim 18, wherein the object related information includes an invoking signature of the base class constructor, and wherein the instructions to analyze the thread-local stack comprise instructions to:
   determine that the exception was thrown responsive to a top item of the thread-local stack not matching the invoking signature of the base class constructor.

20. The system of claim 15, wherein the instructions to analyze the thread-local stack comprise instructions to:
   determine a new function is to be called; and
   review the information in the thread-local stack before the new function is called.

* * * * *